May 17, 1960 J. J. BLACK 2,936,912
TRANSFER SYSTEM FOR CARGO BODIES
Filed March 17, 1958 4 Sheets-Sheet 1
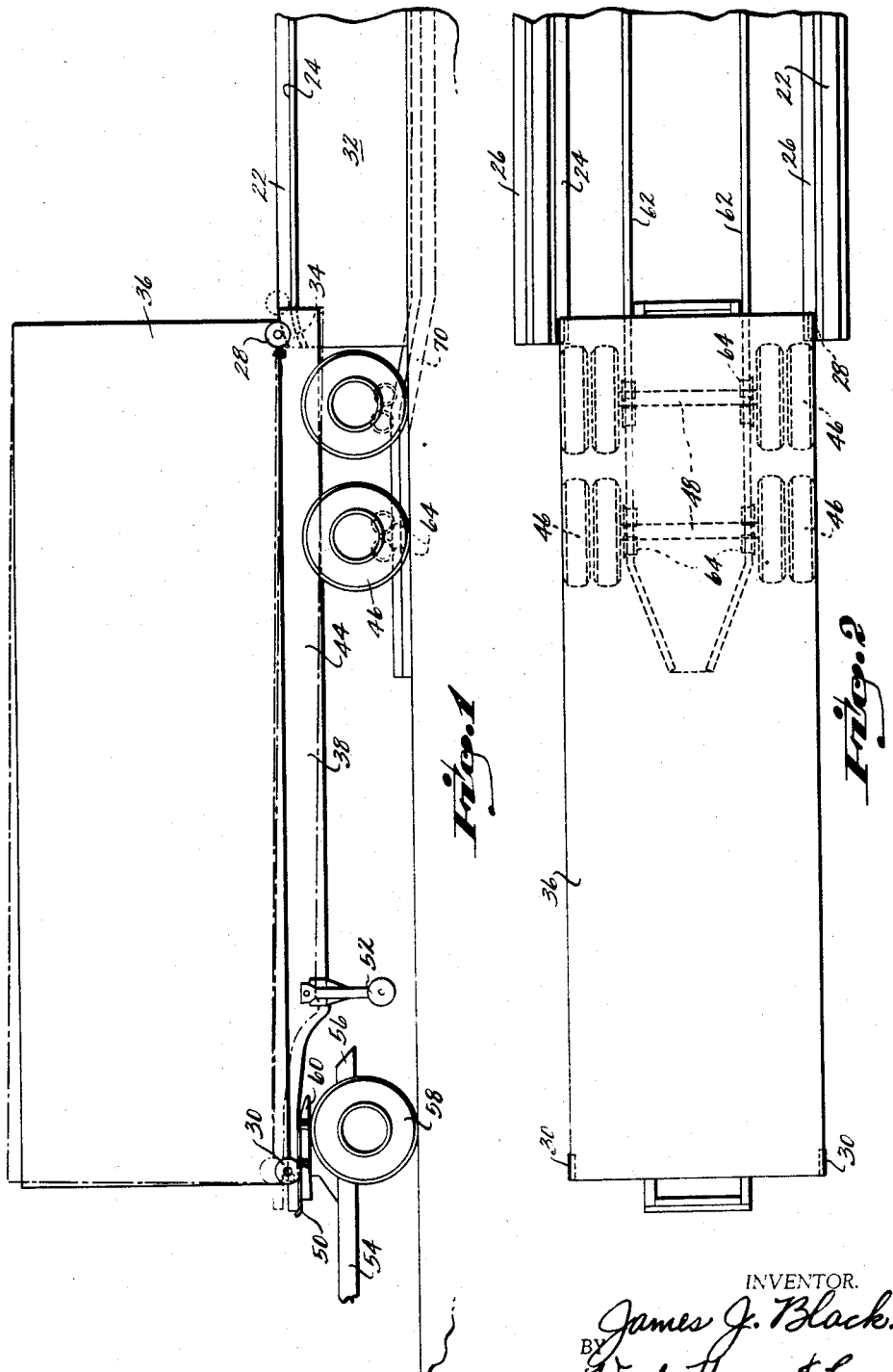
INVENTOR.
James J. Black.
BY
Wood, Herron & Evans.
ATTORNEYS.

May 17, 1960     J. J. BLACK     2,936,912
TRANSFER SYSTEM FOR CARGO BODIES
Filed March 17, 1958     4 Sheets-Sheet 2
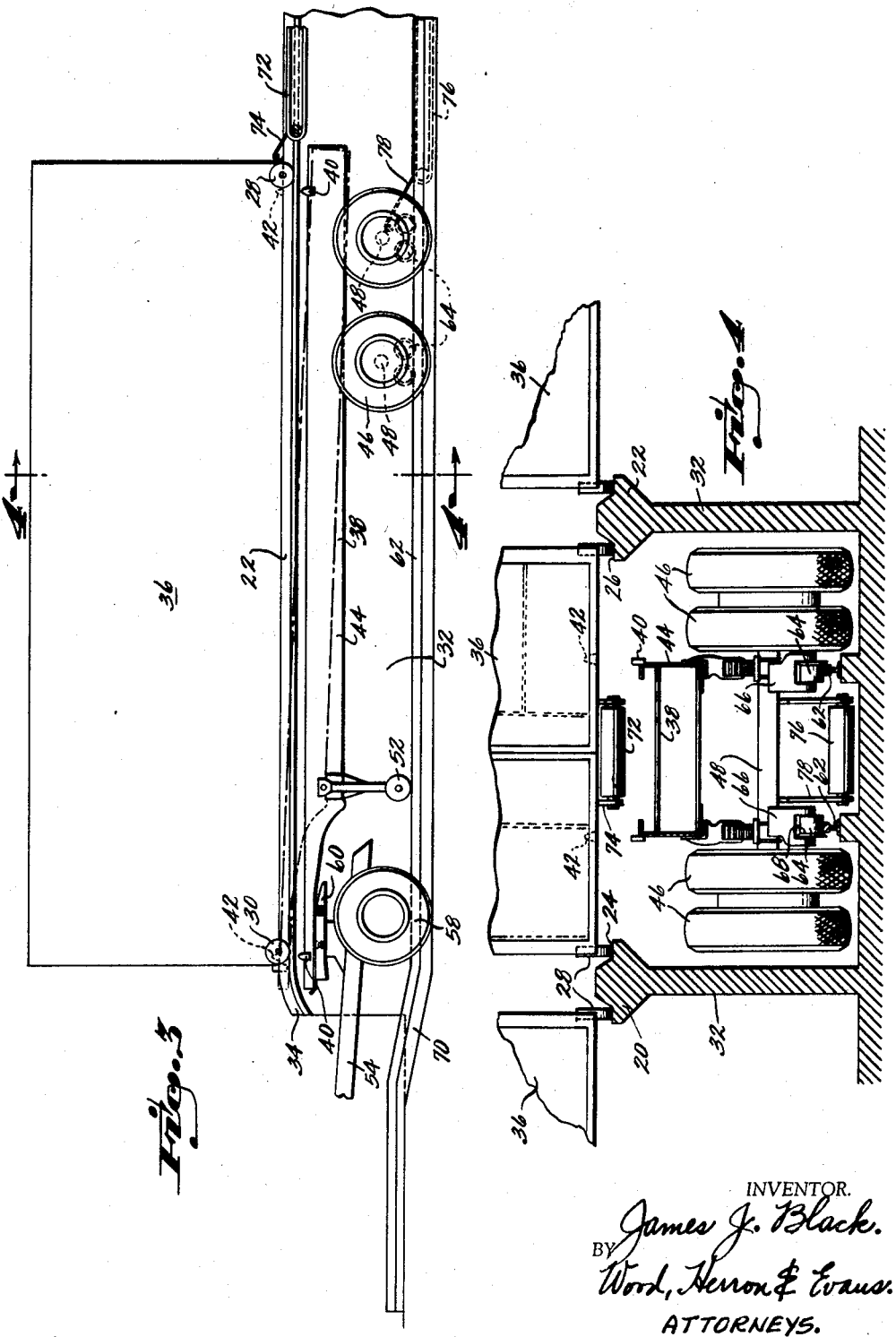
INVENTOR.
James J. Black.
BY Wood, Herron & Evans.
ATTORNEYS.

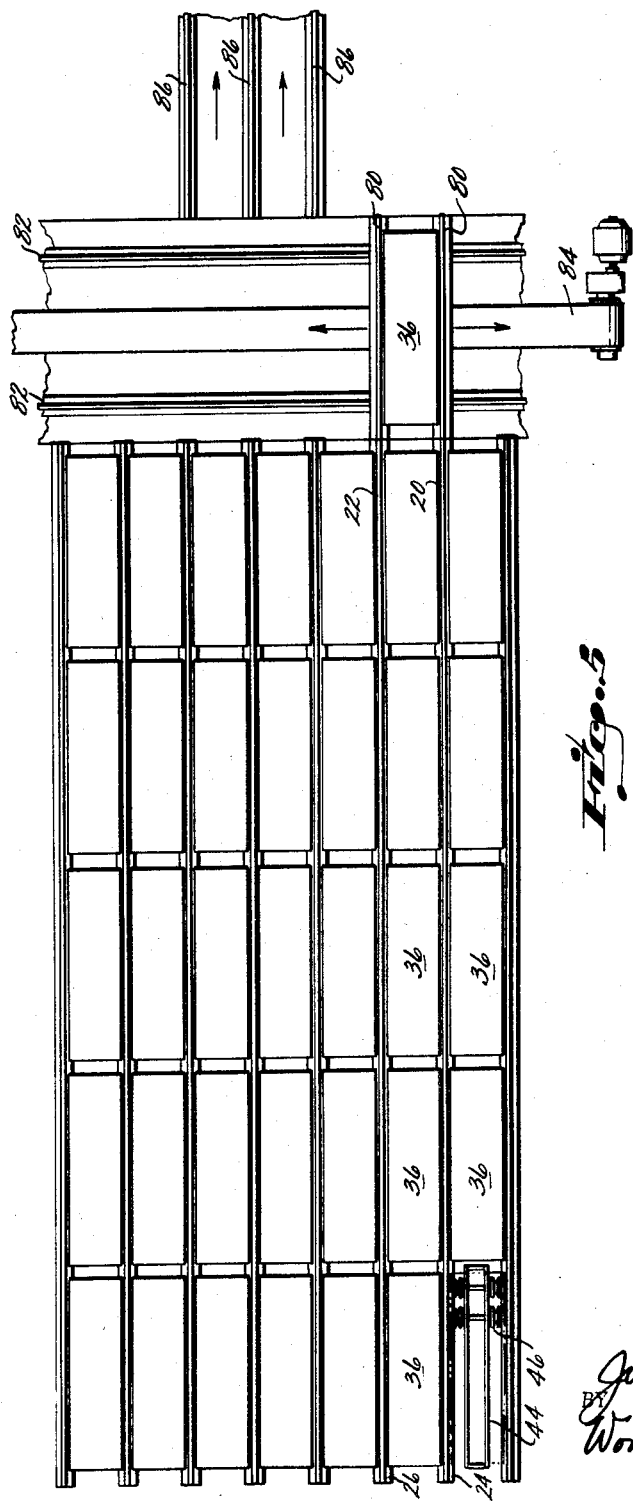

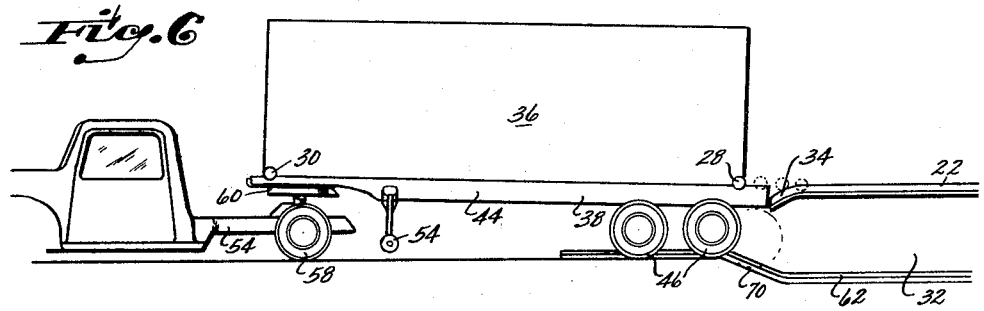
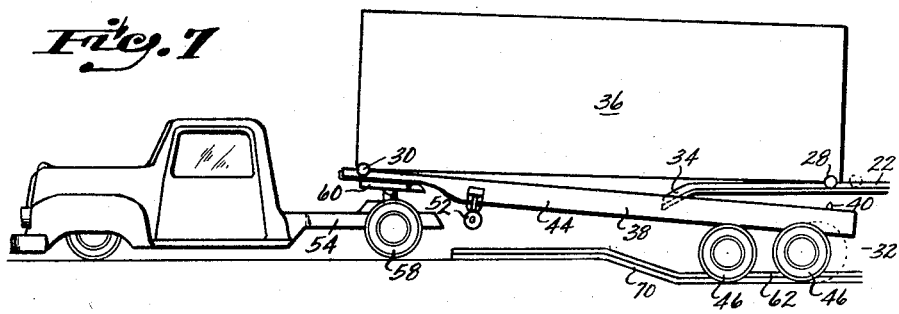
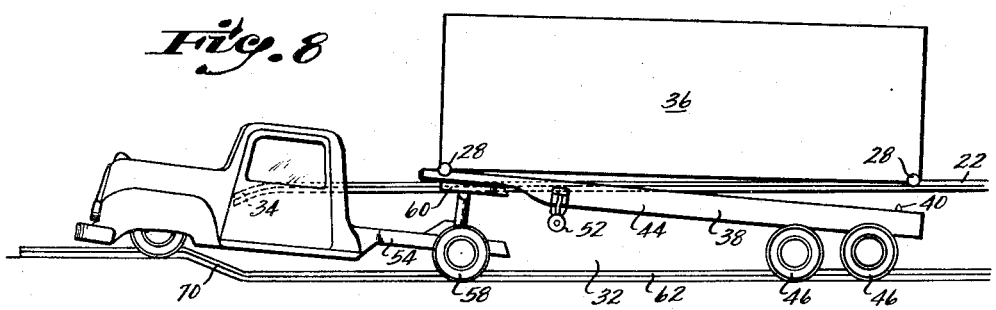
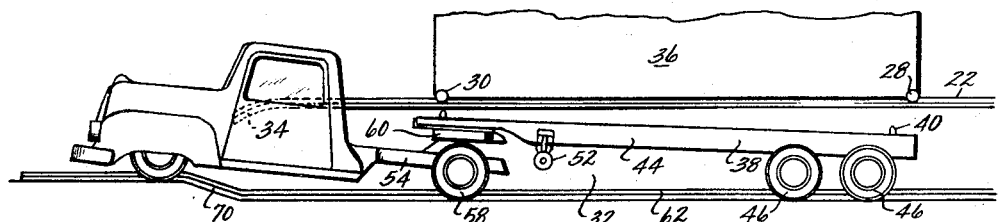

United States Patent Office 2,936,912
Patented May 17, 1960

2,936,912

TRANSFER SYSTEM FOR CARGO BODIES

James J. Black, Cincinnati, Ohio, assignor to Trailmobile Inc., Cincinnati, Ohio, a corporation of Delaware Application March 17, 1958, Serial No. 721,908

2 Claims. (Cl. 214—38)

This invention relates to tractor drawn semi-trailer vehicles and to apparatus cooperable with such vehicles to facilitate loading or unloading the cargo section of the vehicle onto or from rails for further handling of the cargo section.

In accordance with present practices relating to truck hauling, the cargo sections of the trucks or semi-trailers are loaded onto railroad flat cars as in the so called "piggy back" system, or into ship holds as in the so called "fishyback" system, to avoid the necessity of rehandling each item of cargo in the cargo section. Some installations include gantry or hydraulic jacks for lifting or lowering the cargo section bodily from the wheeled chassis on which it has been carried to the transfer point. In other instances, the complete semi-trailer including cargo body and chassis is transferred to rail car or ship. In either, large and powerful lift equipment is required.

The principal objective of this invention has been to provide a system facilitating trans-shipment of a cargo from a semi-trailer vehicle through which the cargo is brought to the transfer station by road, to rails, on which the cargo may be moved onto a railway car or onto a steamship.

A further objective of the invention has been to provide a system wherein a cargo section of a roadway vehicle is vertically detachable from the chassis and load wheels of the roadway vehicle in a virtually automatic way, utilizing tractive effort of the tractor of the roadway vehicle to furnish the motive power for effecting the detachment.

A still further objective of the present invention has been to provide a cargo handling system wherein a plurality of cargo sections of roadway vehicles, when detached from the chassis portions thereof, readily may be stored on rails awaiting trans-shipment to railway cars or a steamship, and wherein cargo sections conveyed to a transfer point by railway car or steamship readily may be loaded onto roadway vehicles one after another in a virtually automatic way without physical lifting of the cargo, such that the need is eliminated for gantry cranes, hydraulic jacks, or the like, which heretofore have been required.

Briefly, this invention is directed to a cargo handling system wherein a wheeled roadway vehicle comprising a chassis and a cargo section vertically detachable therefrom is associated with a tractor having a vertically adjustable fifth wheel for cooperation with a transfer station comprising a downwardly inclined ramp surmounted by horizontal rails spaced from one another to reside along opposite sides of a cargo section carried by a chassis driven onto said ramp, for engagement of the rails with rolls projecting outwardly from the cargo section at opposite sides thereof. In this system the rails are located at a level to be engaged or surmounted by rolls on the cargo section as it is backed onto the ramp under the motive power of the tractor. At this time the vertically adjustable fifth wheel of the tractor is in its elevated position. As the ground wheels of the chassis move down the ramp, the cargo load is transferred from the chassis to the rails, the rolls at the rear end of the cargo section first coming into engagement with the rails, then the rolls at the front end as the trailer is backed down the ramp. Because of the inclination of the ramp or the divergence of the ramp relative to the rails, the chassis drops vertically away from the cargo section and as the unit moves longitudinally and thereby becomes detached therefrom, whereupon the fifth wheel of the tractor is lowered and uncoupled. This leaves the cargo section rollably deposited upon the rails, and the chassis is now free to be pulled up the ramp and driven from the transfer point by the tractor.

By reason of the fact that engagement of the cargo section rollers with the rails is progressive, starting at the rear end, the tractor sustains the front end weight load of the cargo throughout the period until the cargo section is deposited upon the rails, thereby insuring that full tractive effort of the tractor on the ground will be maintained to drive the equipment horizontally onto the transfer station.

For removal by a roadway vehicle of a cargo section which has been brought to the transfer station by railway car or steamship, the cargo section is rolled on the rails to a position above the ramp, a chassis is backed down the ramp or previously has been backed, the vertically adjustable fifth wheel of the tractor therefor being in lowered position. With the fifth wheel of the tractor located under the cargo section, it is then elevated for coupling of the cargo section with the chassis at the front end thereof. The tractor is now driven forwardly, and as the rear wheels of the chassis move up the ramp they come into supporting engagement with the rear portion of the cargo section so as to load the chassis with the cargo section and convey it from the rails.

In the preferred construction cooperable lugs and recesses are employed respectively on the cargo section and the chassis so as to hold the cargo section in predetermined position on the chassis and prevent it from shifting sidewisely or longitudinally relative thereto. These lugs become automatically engaged in their sockets in either the loading or unloading operation just described. In neither operation is any actual lifting function required except such as may be incidental to the movement of the tractor up the ramp under the tractive effort of the tractor on the ground.

The invention further provides a set of rollers mounted on the rear axles of the chassis, the rollers cooperating with chassis rails below the elevated cargo body receiving rails. The lower rails insure proper alignment of the chassis and cargo body with respect to the elevated rails when transferring the cargo body onto the rails, and provides proper alignment of body and chassis when the body is to be transferred onto the chassis.

The invention also provides a storage arrangement consisting of the elevated rails described above; and a cargo body handling system consisting of conveyor driven rails movable into alignment with the elevated rails for receiving and transferring cargo bodies to their ultimate storage destination awaiting transshipment or to the point for transfer to railway cars or steamship.

Further objects of the invention will become more readily apparent from the following detailed description of the invention taken in conjunction with the drawings in which:

Fig. 1 is an elevational view of the invention;

Fig. 2 is a top plan view thereof;

Fig. 3 is a side elevational view of the invention showing a cargo body in loaded position;

Fig. 4 is a sectional view taken along lines 4—4 of Fig. 3;

Fig. 5 is a diagrammatic plan view of the storage and transfer system; and

Figs. 6–9 are diagrammatic side elevational views illustrating the various stages of operation.

The principal structural elements of the invention are best shown with reference to Figs. 1, 2, 3 and 4. The transfer system has as its principal elements two rails 20 and 22. Each rail has an upper surface 24 and 26 respectively for receiving a pair of forward rollers 28 and a pair of rear rollers 30, rotatably mounted on the cargo section of a semi-trailer vehicle.

The rails 20 and 22 are integral with webs 32 which support the rails in an elevated position above the ground. At the receiving end of the rails, are downwardly inclined extensions 34 which serve to insure the proper positioning of the cargo section rollers 28 on the rails and are useful particularly in receiving the rollers of cargo sections which are extremely heavily loaded causing the rollers 28 to be several inches lower than is normally the case.

The rollers 28 and 30 are journalled in the bottom portion of a detachable cargo body 36 in the embodiment illustrated in Figs. 1–4. It will be understood that the invention has application to cargo carriers other than that shown in Figs. 1–4, including for example, a cargo body which is fixed to the chassis. In a cargo section of this type, the rollers 28 and 30 could be journalled in the chassis. Further in a semi-trailer vehicle in which the cargo body overhangs the sides of the chassis, the rollers need not necessarily project beyond the sides of the cargo body. Rather they may be mounted under the floor portion of the cargo body, projecting downwardly for engagement with the rails 20 and 22.

The cargo body 36 is normally mounted on a chassis 38 through the use of suitable positioning means. The positioning means in the illustrated embodiment consists of dowels or lugs 40 fixed to the chassis 38. The lugs 40 cooperate with sockets 42 in the cargo body, and hold the cargo body in predetermined position on the chassis and prevent it from shifting from side to side or longitudinally relative thereto.

The chassis 38 is generally of known design consisting of frame 44 supported at the rear end on two pairs of rear wheels 46 mounted on axles 48. An upper fifth wheel 50 is attached to the forward end of frame 44 and is engageable, for support, with a vertically elevatable fifth wheel 60 mounted on a tractor 54. A prop 52 is pivotally mounted on the frame 44 for supporting the chassis when it is disengaged from the tractor 54.

A fragment of the tractor 54 is illustrated in Figs. 1 and 3 and consists of a frame member 56 supporting two rear traction wheels and the hydraulically elevated lower fifth wheel 60 of known design having a king pin (not shown) for providing the cooperative hauling engagement of the tractor fifth wheel 60 with the chassis fifth wheel 50.

To insure proper alignment of the chassis with the cargo body during both the operations of transferring the cargo body onto the rails 20—22 and transferring the cargo from the rails 20—22 onto a chassis, guide rails 62 are provided. The rails below the roller receiving surfaces 24—26 of the rails 20—22 sufficient to cause the separation of the cargo body from the chassis. The rails 62 receive rollers 64 journalled in U-shaped brackets 66 which are fixed to the axles 48. Each of the rollers 64 has an outside flange 68 which maintains the rollers and chassis in proper alignment on the rails 62.

At the receiving end of the transfer structure, the rails 62 are inclined as indicated at 70 to form a ramp down which the chassis travels to effect the separation of chassis and cargo body in the manner described below.

The stages of operation of the invention thus far described are illustrated in Figs. 6–9. In Fig. 6, the semi-trailer has backed into position to begin the transfer operation. At this point, the hydraulic jack is in an elevated position in which the forward rollers 30 are maintained a distance above ground level sufficient to assure their clearing the rails 20—22 when the forward part of the chassis moves down the ramp portion 70 of rails 62. The rear rollers 28, under normal loading, are located a slight distance above rails 20—22 so as to clear the receiving end portion of the rails as the tractor begins to back the trailer.

The tractor backs the trailer toward the rails 20—22 and 62, first causing engagement of the chassis rollers 64 with the rails 62 to perfect the alignment of the cargo body rollers 28 with the rail structure. The chassis continues toward the ramp portion 70 causing the rear rollers 28 to pass over the rails 20—22 and, as the chassis moves down the ramp, to settle in proper position on the surfaces 24—26 of the elevated rails. This stage is illustrated in Fig. 6. It will be appreciated from consideration of Fig. 6, that a substantial portion, approximately half, of the weight of the cargo body 36 rests on the fifth wheel 60 of the tractor. This relationship is a very important aspect of the invention for it is the added weight of the cargo body to the tractor which gives the tractor enough traction to continue to drive the cargo body 36 onto the rails.

The tractor continues to drive the cargo body and chassis rearwardly until the position shown in Fig. 8 is reached. In this position, the cargo body 36 including the rollers 28 and 30 is over the horizontal portion of rails 20—22. The rollers 28 are elevated slightly above the wheels because of the elevated position of the tractor fifth wheel 60. The tractor fifth wheel is then lowered by the means of the hydraulic jack so that the elements take the position illustrated in Fig. 9 in which the cargo body 36 is completely supported by the rails 20—22, and is detached from the tractor and chassis. In this position, the cargo body is ready for handling by conveyor arrangements to be described below.

The chassis can remain attached to the tractor and the combined tractor and chassis driven away from the transfer system to receive other cargo bodies for additional hauling. Alternatively, the chassis can be conveyed back on the rails 62 for temporary storage. There the chassis remains until it is necessary to remove a cargo body coming from the transfer system, to be hauled away to another location.

The operation of removing cargo bodies from the rails 20—22 is just the reverse of that described in connection with Figs. 6–9. In the reverse operation, the tractor and chassis are moved to the position shown in Fig. 9, with lugs 40 aligned with the sockets 42. The hydraulic jack is operated to raise fifth wheel 60 bringing the chassis into engagement with the cargo body, the dowels 40 being received in the sockets 42. This stage of operation is illustrated additionally in Fig. 3, the broken lines indicating the position of the chassis when the fifth wheel 60 has been elevated.

The elevation of the chassis should be sufficient to insure that a substantial portion of the weight of the cargo body is on the tractor 54 to provide traction of the wheels 58 with the ground. The cargo body can then be hauled off the rails 20—22 in the stages illustrated in Figs. 7 and 6. The jack is then lowered so that the semi-trailer takes the position shown in Fig. 6 ready for hauling away.

The handling system for transferring the cargo body and moving the chassis to storage is illustrated with reference to Figs. 3 and 5. Referring particularly to Fig. 3, there is shown a conveyor 72 driven by a motor (not shown) and having a lug arrangement 74 fixed thereto for engagement with the cargo body to pull the cargo body back along the rails 20—22 after it has been separated from its chassis. The conveying of the cargo body frees the receiving end portion of rails 20—22 to permit additional cargo bodies to be brought in. Thus, a number of cargo bodies can be stored awaiting further handling on the rails 20—22 as indicated in Fig. 5.

Fig. 5 also illustrates the manner in which each rail, except the outside rails, can support the rollers of two adjacent cargo bodies. This feature is also illustrated in Fig. 4 and consists of a vertical, longitudinally extending flange which separates each elevated rail into two roller receiving surfaces.

Referring again to Fig. 3, an endless conveyor 76 equipped with lugs 78 runs between the lower rails 60—62 for pulling the chassis 38 back into storage underneath the cargo bodies.

A system for the further handling by the cargo bodies is illustrated in Fig. 5 and consists of parallel rails 80 fixed in spaced relation and mounted for movement on transverse rails 82. The transverse rails 80 can be moved to positions adjacent the rails 20—22 by means of motor driven endless conveyor 84. When positioned adjacent the rails 20—22, a cargo body can be conveyed onto the transverse rails and then shifted to another area of the loading station 86 for further transfer. For example, the rails indicated at 86 could be rails for transporting the cargo body to the hold of a ship or to flat cars or the like.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. Apparatus for selective engagement and disengagement of a cargo section with respect to a semi-trailer chassis connected to a tractor by an upper fifth wheel, said apparatus comprising, horizontally spaced rails, said rails having a cargo section receiving upper surface located a distance above ground level, a downwardly inclined ramp below said rails for receiving at least the chassis of a semi-trailer for selective engagement and disengagement of the end of said chassis remote from said fifth wheel with respect to said cargo section when said cargo section is disposed on said rails, and an elevatable fifth wheel on said tractor for supporting the fifth wheel end of said chassis, whereby the end of said cargo section normally adjacent said fifth wheel may selectively be removed or disposed on said rails.

2. The method of connecting a cargo section to a semi-trailer chassis having its forward end connected to the fifth wheel of a tractor and removing said cargo section from supporting rails on each side of said cargo section comprising the steps of positioning said chassis between said rails and directly below said cargo section, elevating said fifth wheel relative to said tractor and thereby bringing the forward end of said chassis into engagement with said cargo section, connecting the forward end of said chassis to said cargo section, and removing said cargo section from said rails by moving said tractor and connected chassis and cargo section forward until the entire cargo section is gradually brought into fully supported engagement with said chassis.

References Cited in the file of this patent

UNITED STATES PATENTS

| | | |
|---|---|---|
| 1,422,663 | Callison | July 11, 1922 |
| 1,611,882 | Budd | Dec. 28, 1926 |
| 2,379,094 | Maxon | June 26, 1945 |
| 2,689,137 | Iddings et al. | Sept. 14, 1954 |
| 2,720,324 | Cosentino | Oct. 11, 1955 |
| 2,834,485 | Simmonds | May 13, 1958 |
| 2,837,226 | Gutridge | June 3, 1958 |

FOREIGN PATENTS

| | | |
|---|---|---|
| 862,123 | Germany | Jan. 8, 1953 |